United States Patent
Hagiwara et al.

(10) Patent No.: US 7,196,340 B2
(45) Date of Patent: Mar. 27, 2007

(54) RADIATION IMAGE CONVERSION PANEL

(75) Inventors: Kiyoshi Hagiwara, Hino (JP); Natsuki Kasai, Hamura (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 0 days.

(21) Appl. No.: 11/218,895

(22) Filed: Sep. 6, 2005

(65) Prior Publication Data
US 2006/0049366 A1    Mar. 9, 2006

(30) Foreign Application Priority Data
Sep. 9, 2004    (JP)    .............................. 2004-262481

(51) Int. Cl.
    *G03B 42/08*    (2006.01)
(52) U.S. Cl. .................................. 250/484.4
(58) Field of Classification Search ............. 250/484.4
    See application file for complete search history.

(56) References Cited

U.S. PATENT DOCUMENTS

| | | | |
|---|---|---|---|
| 4,855,191 A * | 8/1989 | Arakawa et al. ............ | 428/690 |
| 4,944,026 A * | 7/1990 | Arakawa et al. .......... | 250/484.4 |
| 4,977,327 A * | 12/1990 | Arakawa et al. .......... | 250/484.4 |
| 5,032,732 A * | 7/1991 | Ito ........................... | 250/484.4 |
| 5,569,485 A | 10/1996 | Dahlquist et al. | |
| 6,376,844 B1 * | 4/2002 | Tasaki et al. ............ | 250/484.4 |
| 6,465,794 B1 * | 10/2002 | Suzuki .................... | 250/484.4 |
| 6,521,329 B2 * | 2/2003 | Aylward et al. ........... | 428/212 |

FOREIGN PATENT DOCUMENTS

| | | |
|---|---|---|
| EP | 0 223 062 A2 | 5/1987 |
| EP | 0 274 126 A1 | 7/1988 |
| EP | 0 377 470 A1 | 7/1990 |
| JP | 2000-227500 | 8/2000 |

OTHER PUBLICATIONS

European Search Report dated Dec. 15, 2006, in counterpart European application number 05255446.6-1218.

* cited by examiner

*Primary Examiner*—David Porta
*Assistant Examiner*—Mark R. Gaworecki
(74) *Attorney, Agent, or Firm*—Finnegan, Henderson, Farabow, Garrett, & Dunner, L.L.P.

(57) ABSTRACT

It is an object of the present invention to provide a radiation image conversion panel exhibiting durability. By providing a radiation image conversion panel possessing a phosphor sheet having a support and provided thereon a stimulable phosphor layer and a protective film which covers the phosphor sheet, and an electrically conductive layer is designed to be provided on at least one of the surfaces on the stimulable phosphor layer side of the phosphor sheet and on the stimulable phosphor layer side of the protective film, undesired electrons generated within the stimulable phosphor layer can be removed via the electrically conductive layer, whereby degradation of the stimulable phosphor caused by the electrons is prevented, thereby improving durability.

6 Claims, 1 Drawing Sheet

RADIATION IMAGE CONVERSION PANEL

This application claims priority from Japanese Patent Application No. 2004-262481 filed on Sep. 9, 2004, which is incorporated hereinto by reference.

TECHNICAL FIELD

The present invention relates to a radiation image conversion panel, and specifically to a radiation image conversion panel having a stimulable phosphor.

BACKGROUND

Radiation images, as represented by X-ray images, have long been employed for use in medical diagnosis. A radiation image reproducing method employing a stimulable phosphor has recently been proposed, and can practically be used to obtain radiation images, whereby a stimulable phosphor layer in a radiation image conversion panel is subjected to being exposed to radiation, such as X-ray or such, that has been transmitted through an object via this method, and a radiation energy depending on radiation transmittance on each part of the object is accumulated. The accumulated radiation energy is subsequently emitted as stimulated luminescence by scanning the stimulable phosphor layer with stimulated emission light, whereby the stimulated luminescence is converted into image signals via a photoelectric conversion means to acquire a radiation image expressed as digital image data.

A panel in which a stimulable phosphor layer containing a stimulable phosphor is provided on a support is commonly known as a radiation image conversion panel used in a radiation image reproducing method (refer to Patent Document 1, as an example.).

[Patent Document 1] Japanese Patent O.P.I. Publication No. 2002-277598

SUMMARY

In the case of the above Patent Document 1, however, stimulable phosphor exposed repeatedly to X-rays is often deteriorated via long-term use in a radiation image conversion panel. Deterioration of the stimulable phosphor in a stimulable phosphor layer has produced problems such that stimulated luminescence is difficult to be emitted, and consequently a radiation image is also difficult to be obtained.

It is an object of the present invention to provide a radiation image conversion panel exhibiting durability.

BRIEF DESCRIPTION OF THE DRAWINGS

Embodiments will now be described, by way of example only, with reference to the accompanying drawings which are meant to be exemplary, not limiting, and wherein like elements numbered alike in several figures, in which.

DESCRIPTION OF THE PREFERRED EMBODIMENTS

Figure 1:
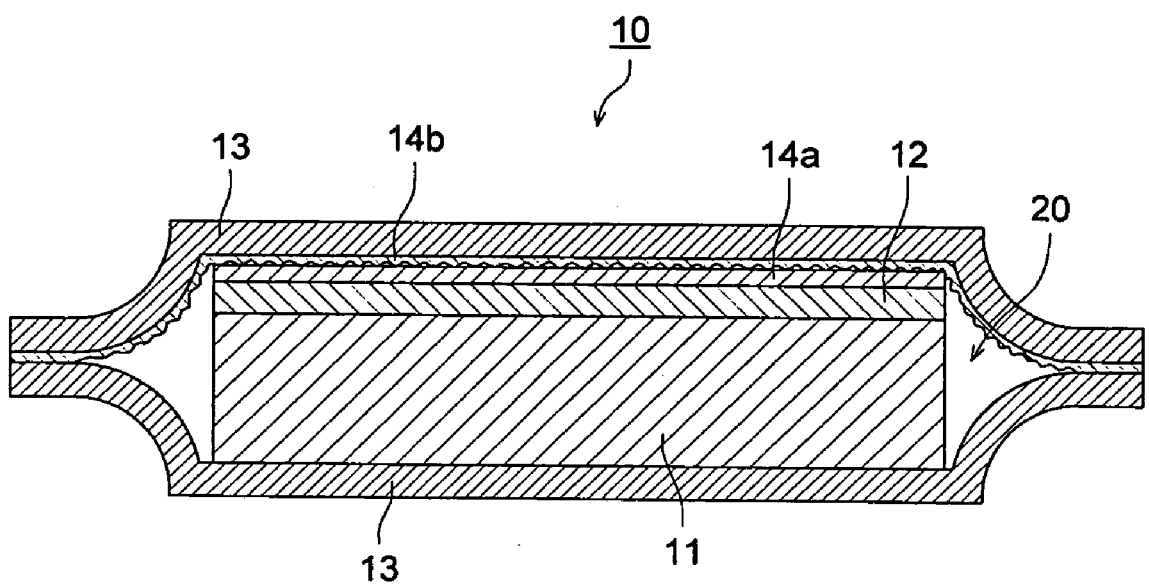
FIG. 1 is a schematic cross-sectional view showing a radiation image conversion panel in the present invention.

The above object of the present invention is accomplished by the following structures.

(Structure 1) A radiation image-conversion panel possessing a phosphor sheet having a support and provided thereon, a stimulable phosphor layer, and a protective film covering the phosphor sheet, wherein an electrically conductive layer is provided on either the phosphor sheet or the protective film, and is brought into contact with a surface of the phosphor sheet on a stimulable phosphor layer side.

(Structure 2) The radiation image conversion panel of Structure 1, wherein an electrically conductive layer is provided on the phosphor sheet, and is brought into contact with the surface of the phosphor sheet on the stimulable phosphor layer side.

(Structure 3) The radiation image conversion panel of Structure 1, wherein an electrically conductive layer is provided on the protective film, and is brought into contact with the surface of the phosphor sheet on the stimulable phosphor layer side.

(Structure 4) The radiation image conversion panel of Structure 1, wherein electrically conductive layers are provided on both the phosphor sheet and the protective film, and are brought into contact with the surface of the phosphor sheet on the stimulable phosphor layer side and a surface of the electrically conductive layer provided on the stimulable phosphor layer.

According to the radiation image conversion panel of the invention described in Structure 1, an electrically conductive layer is provided on at least one of the surfaces on the side of the stimulable phosphor layer provided on a support and also on the stimulable phosphor layer side of the protective film covering the phosphor sheet. Electrical conductivity is provided to the stimulable phosphor layer surface by forming the electrically conductive layer on the surface. Similarly, electrical conductivity is also provided to the stimulable phosphor layer surface by forming the electrically conductive layer of the surface on the stimulable phosphor layer side of the protective film covering the phosphor sheet. Undesired electrons generated within the stimulable phosphor layer can be effectively discharged from that layer by providing electrical conductivity to the stimulable phosphor layer.

Undesired electrons generated within the stimulable phosphor layer by exciting the phosphor with an energy possessed by X-rays or such which irradiate the stimulable phosphor layer can be easily and efficiently discharged to the exterior of the phosphor sheet and to the radiation image conversion panel from the stimulable phosphor layer via the electrically conductive layer. In other words, undesired electrons generated within the stimulable phosphor layer by exciting the phosphor with X-ray energy or such can be efficiently removed from the stimulable phosphor layer via the electrically conductive layer. Since undesired electrons within the stimulable phosphor layer can be removed from the stimulable phosphor layer by the electrically conductive layer, degradation of the stimulable phosphor in the stimulable phosphor layer caused by such electrons can be minimized.

When an electrically conductive layer is provided on at least one of the surfaces on the stimulable phosphor layer side, and also on the stimulable phosphor layer side of the protective film covering the phosphor sheet in this manner, degradation of the stimulable phosphor caused by electrons generated via exposure to light irradiation can be minimized, whereby a radiation image conversion panel exhibiting X-ray resistance or such can be obtained.

(Structure 5) The radiation image conversion panel of Structure 1, wherein a surface resistance of the electrically conductive layer is not more than $2.0 \times 10^{10}$ Ω.

According to Structure 5, similarly to what is described in Structure 1, undesired electrons generated within the stimulable phosphor layer can be easily discharged to the exterior of the radiation image conversion panel via the electrically conductive layer to efficiently remove the undesired electrons, since the surface resistance of the electrically conductive layer is not more than $2.0 \times 10^{10}$ Ω. Thus, degradation of the stimulable phosphor in the stimulable phosphor layer can be minimized, whereby a radiation image conversion panel exhibiting X-ray resistance, or such can be obtained.

(Structure 6) The radiation image conversion panel of Structure 1 or 5, wherein the stimulable phosphor is a rare earth activated alkaline earth metal fluorohalide stimulable phosphor represented by following General Formula (I):
General Formula;

where $M^2$ is at least an alkaline earth metal atom selected from the group, including Mg, Ca, Sr and Cd; X is at least a halogen atom selected from the group including Cl, Br and I; $M^1$ is at least an alkali metal atom selected from the group including Li, Na, K, Rb and Cs; Ln is at least a rare earth atom selected from the group including Ce, Pr, Sm, Eu, Gd, Tb, Tm, Dy, Ho, Nd, Er and Yb; and x, y, a, b and c are values satisfying the following conditions: $0 \leq x \leq 0.3$, $0 \leq y \leq 0.3$, $0 \leq a \leq 0.05$, $0 < b \leq 0.2$ and $0 < c \leq 0.1$.

According to Structure 6, similarly to what is described in Structure 1 or 5, the stimulable phosphor is a rare earth activated alkaline earth metal fluorohalide stimulable phosphor represented by General Formula (I). Since a rare earth activated alkaline earth metal fluorohalide stimulable phosphor exhibits a high radiation (X-ray) absorption, a high-sensitivity stimulable phosphor layer can be formed to manufacture a radiation image conversion panel capable of recording and photographing further improved images.

(Structure 7) The radiation image conversion panel of any one of Structures 1–6, wherein the stimulable phosphor is a stimulable phosphor possessing BaFI as a principal substance.

According to Structure 7, similarly to what is described in any one of Structures 1–6, since the stimulable phosphor is a stimulable phosphor possessing BaFI as the principal substance, a high-sensitivity stimulable phosphor layer can be formed to obtain a radiation image conversion panel capable of recording and photographing further improved images.

While the preferred embodiments of the present invention have been described using specific terms, such description is for illustrative purposes only, and it is to be understood that changes and variations may be made without departing from the spirit or scope of the appended claims.

DETAILED DESCRIPTION OF THE INVENTION

Embodiments of this invention will be detailed below. A stimulable phosphor layer in a radiation image conversion panel is subjected to exposure to X-ray irradiation or such that has been transmitted through an object, and the radiation image conversion panel of the present invention accumulates a radiation energy depending on radiation transmittance on each part of the object. The accumulated radiation energy is subsequently emitted as stimulated luminescence by scanning the stimulable phosphor layer with stimulated emission light, and the stimulated luminescence is converted into image signals to acquire a radiation image. Specifically in the present invention, an electrically conductive layer is placed so as to touch the stimulable phosphor layer, and degradation of the stimulable phosphor layer caused by undesired electrons can be minimized by removing the electrons generated within the stimulable phosphor layer via the electrically conductive layer to obtain the radiation image conversion panel.

FIG. 1 is a schematic cross-sectional view of radiation image conversion panel 10, constituted of support 11, stimulable phosphor layer 12 provided on support 11, protective film 13 covering phosphor sheet 20 in which stimulable phosphor layer 12 is provided on support 11, and so forth. Electrically conductive layer 14a is provided on the surface of stimulable phosphor layer 12 of phosphor sheet 20, and electrically conductive layer 14b is also provided on the surface of the stimulable phosphor layer 12 side of protective film 13 placed on the stimulable phosphor layer 12 side of phosphor sheet 20.

Support 11 is a supporting material to support stimulable phosphor layer 12 provided on the surface. Various polymeric materials, metal, glass, and other materials are used for support 11. A film or a sheet exhibiting flexibility is especially suitable in view of handling. Specific preferred examples include plastic films such as a cellulose acetate film, a polyester film, a polyethylene terephthalate film, a polyamide film, a polyimide film, a triacetate film and a polycarbonate film, as well as metal sheets such as an aluminum sheet, an iron sheet, a copper sheet, and a chromium sheet.

The layer thickness of support 11, depending on materials used, is usually 3–1000 μm, and preferably 80–500 μm. Support 11 may be smooth-surfaced, or it may be matted in order to enhance adhesion of stimulable phosphor layer 12.

Stimulable phosphor layer 12 is a layer in which a rare earth activated alkaline earth metal fluorohalide stimulable phosphor, represented by following General Formula (I), is dispersed and contained in a binder solution, and a coating solution used for a stimulable phosphor layer containing stimulable phosphor particles is coated onto support 11 to obtain a predetermined thickness. In this case, the average stimulable phosphor particle size is 2–20 μm, and preferably 3–15 μm.

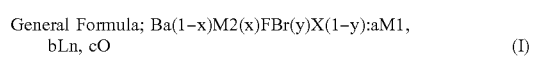

These stimulable phosphor layers can also be formed by a vapor deposition method such as an evaporation method or such. In the case of vapor deposition, an alkali metal halide such as CsBr, RbBr or such can commonly be used in the phosphor layers. Incidentally, examples obtained via vapor deposition such as evaporation or such are described in Japanese Patent O.P.I. Publication No. 62-133399 and Japanese Patent O.P.I. Publication No. 62-133400.

For the stimulable phosphor represented by General Formula (I), $M^2$ is at least an alkaline earth metal atom selected from the group including Mg, Ca, Sr and Cd. X is at least a halogen atom selected from the group including Cl, Br and I. Of these, I is preferably used. $M^1$ is at least an alkali metal atom selected from the group including Li, Na, K, Rb and Cs. Ln is at least a rare earth atom selected from the group including Ce, Pr, Sm, Eu, Gd, Tb, Tm, Dy, Ho, Nd, Er and Yb. Of these, Eu is preferably used, and these metals are used as the activator.

For the stimulable phosphor stoichiometrically represented by General Formula (I), x, y, a, b and c are values satisfying the following conditions: $0 \leq x \leq 0.3$, $0 \leq y \leq 0.3$, $0 \leq a \leq 0.05$, $0 < b \leq 0.2$ and $0 < c \leq 0.1$, wherein preferably y=0.

Especially employed in the present embodiments is a stimulable phosphor in which Eu-activated BaFI obtained in combination with suitable atoms (X; I, Ln; Eu) and the condition (y=0) is a basic substance.

The coating solution containing such stimulable phosphor is adjusted to be prepared by mixing a given organic solvent and a binder to attach the stimulable phosphor to support 11.

Examples of binders according to the present invention include proteins such as gelatin; polysaccharide such as dextran; natural polymeric materials and resins such as arabic gum; or synthetic polymeric materials such as polyvinyl butyral, polyvinyl acetate, nitrocellulose, ethylcellulose, vinylidene chloride/vinyl chloride copolymer, polyalkyl (metha) acrylate, vinyl chloride/vinylacetate copolymer, polyurethane, cellulose acetate bytylate, polyvinyl alcohol and linear polyester. Of these binders, preferred are nitrocellulose, linear polyester, polyalkyl (metha)acrylate, a mixture of nitrocellulose and linear polyester, a mixture of nitrocellulose and polyalkyl (metha)acrylate and a mixture of polyurethane and polyvinyl butyral. Incidentally, the binder may be cured with a cross-linking agent.

Though the mixing ratio of the binder to the stimulable phosphor depends on characteristics of the objective radiation image conversion panel and the kind of stimulable phosphor, binders are preferably used in an amount ranging from 1 to 20 parts by weight, based on the stimulable phosphor, and more preferably used in an amount ranging from 2 to 10 parts by weight, based on the stimulable phosphor.

Examples of organic solvents used to prepare a coating solution of the present invention include lower alcohols such as methanol, ethanol, isopropanol and n-butanol; ketones such as acetone, methyl ethyl ketone, methyl isobutyl ketone and cyclohexanone; esters of a lower fatty acid and lower alcohol such as methyl acetate, ethyl acetate and butyl acetate; ethers such as dioxane, ethylene glycol ethyl ether and ethylene glycol monomethyl ether; aromatic compounds such as tolyol and xylol; halogenated hydrocarbons such as methylene chloride and ethylene chloride; and various mixtures thereof.

Incorporated may be, in the coating solution, a variety of additives, such as a dispersing agent to improve dispersibility of the phosphor in the coating solution and a plasticizer to enhance bonding strength between the binder and phosphor. Examples of the dispersing agent include phthalic acid, stearic acid, caproic acid and oleophilic surfactants. Examples of the plasticizer include phosphate esters such as triphenyl phosphate, tricresyl phosphate and diphenyl phosphate; phthalate esters such as diethyl phthalate, and dimethoxyethyl phthalate; glycolic acid esters such as ethylphthalyethyl glycolate and dimethoxyethyl glycolate; and polyesters of polyethylene glycol and aliphatic dibasic acid such as polyester of triethylene glycol and adipinic acid, or polyester of diethylene glycol and succinic acid.

A coating solution preparation process is conducted by mixing a binder and a stimulable phosphor with a given organic solvent, employing a dispersing apparatus or a mixer, such as a ball mill, a beads mill, a sand mill, an attritor, a three-roll mill, a high-speed impeller, a Kady mill or an ultrasonic homogenizer.

A stimulable phosphor coating layer is formed by uniformly coating the resulting coating solution onto the surface of support 11. Examples of conventional coating techniques employed as the method to coat the coating solution onto support 11 include a blade coater, a roll coater, a knife coater, a comma coater and a lip coater. The coated layer is subsequently heated, and dried to form stimulable phosphor layer 12 on support 11. The thickness of stimulable phosphor layer 12 depends on characteristics of the desired radiation image conversion panel, the kind of stimulable phosphor and the mixing ratio of the binder to the phosphor, and is preferably 10–1000 µm, and is more preferably 10–500 µm.

Electrically conductive layer 14a is provided on the surface of stimulable phosphor layer 12 formed in this manner. Electrically conductive layer 14a is a thin layer having a thickness of several nanometers to several hundreds of nanometers, in which a given electrically conductive metal is provided on the surface of stimulable phosphor layer 12 via evaporation or such. At least one electrically conductive metal selected from the group including Ag, Sn, Zn, In, Cu, Pb, Ni, Ti, Sb, Au, and Al is employed as a given electrically conductive metal. Examples of the apparatus for forming the electrically conductive layer on the surface of stimulable phosphor layer 12 include a vacuum evaporation apparatus, a molecular beam epitaxy apparatus, an ion plating apparatus, an ion beam deposition apparatus, a sputtering apparatus and a plating apparatus. Incidentally, not only electrically conductive metals but also electrically conductive oxides and electrically conductive organic substances may be used for the electrically conductive layers. Examples of electrically conductive oxides include In—Sn oxide, In—As oxide, and so forth. Examples of electrically conductive organic substances include polythiophene compounds such as polyethylenedioxythiophenepolystyrenesulfonate, poly(2-methoxy-5-(2'-ethyl-hexyloxy)-1,4-phenylenevinylene, sexithiophene, poly(3-alkyltifen), and so forth.

Electrically conductive layer 14a provided on the surface of stimulable phosphor layer 12 in this manner is a metal layer in which undesired electrons generated by exciting a phosphor with an energy possessed by X-rays or such which irradiate stimulable phosphor layer 12 can be efficiently discharged to the exterior of phosphor sheet 20 and radiation image conversion panel 10 from stimulable phosphor layer 12 via protective film 13. In other words, electrically conductive layer 14a is a metal layer having a function to remove undesired electrons generated within stimulable phosphor layer 12 from stimulable phosphor layer 12 by exciting the phosphor with X-ray energy or such. Since undesired electrons within stimulable phosphor layer 12 can be removed from stimulable phosphor layer 12 by electrically conductive layer 14a, degradation of the stimulable phosphor in stimulable phosphor layer 12 caused by such electrons can be minimized.

In order to protect electrically conductive layer 14a and stimulable phosphor layer 12 provided on support 11 as described above, phosphor sheet 20 composed of support 11 and stimulable phosphor layer 12 is covered by protective film 13 so as to shield against ambient air. Protective film 13 is placed so as to touch both surfaces on the side of stimulable phosphor layer 12 (on the side of electrically conductive layer 14a) and on the side of support 11 of phosphor sheet 20, and protective film 13, extending to the peripheral area of phosphor sheet 20, is adhered to the portion along with circumference of phosphor sheet 20 by an adhesive means such as an adhesive agent or so forth. When phosphor sheet 20 is covered by protective film 13 in this manner, stimulable phosphor layer 12 and electrically conductive layer 14a can be protected from scratches and other damage, and at the same time change in quality caused by moisture absorption of stimulable phosphor layer 12 can also be prevented.

Examples which can be employed as protective film 13 include a polyester film, a polymethacrylate film, a nitrocellulose film, a cellulose acetate film, and other appropriate films. Preferred examples of protective films in view of transparency and strength include stretch-processed films such as a polyethylene terephthalate film and a polyethylene naphthalate film, however, more preferably used is an evaporated film, to which a moisture resistance property is provided by evaporating metal oxide, silicon nitride or such onto the surface of the polyethylene terephthalate film or the polyethylene naphthalate film.

It is preferable that protective film 13 possesses a stimulating light absorbing layer in which the haze ratio measured by the method in accordance with ASTMD-1003 is between 5–60%, however the haze ratio is more preferably between 10–50%. A haze ratio of less than 5 percent is not preferred since effects to minimize image unevenness, as well as to minimize linear noise, decrease. On the other hand, a haze ratio of not less than 60 percent is also not preferred, since the image sharpness is degraded.

In the present embodiments concerning protective film 13, electrically conductive layer 14b is provided on the surface of the stimulable phosphor layer 12 side (on the side of electrically conductive layer 14a) of protective film 13 placed on the stimulable phosphor layer 12 side (on the side of electrically conductive layer 14a) of phosphor sheet 20. Electrically conductive layer 14b, which is the same metal layer as electrically conductive layer 14a provided on stimulable phosphor layer 12, is a thin layer having a thickness of several nanometers to several hundreds of nanometers, in which a given electrically conductive metal is provided on the surface of stimulable phosphor layer 12 via evaporation or such. At least one electrically conductive metal selected from the group including Ag, Sn, Zn, In, Cu, Pb, Ni, Ti, Sb, Au, and Al is employed as a given electrically conductive metal. Examples of the apparatus to form the electrically conductive layer on the surface of protective film 13 include a vacuum evaporation apparatus, a molecular beam epitaxy apparatus, an ion plating apparatus, an ion-beam deposition apparatus, a sputtering apparatus and a plating apparatus.

Since protective film 13 is placed so as to touch stimulable phosphor 12 of phosphor sheet 20 facing protective film 13, electrically conductive layer 14b provided on the surface of protective film 13 in this manner is a metal layer in which undesired electrons generated by exciting a phosphor with an energy possessed by X-rays or such which irradiate stimulable phosphor layer 12 can be efficiently discharged to the exterior of phosphor sheet 20 and radiation image conversion panel 10 from stimulable phosphor layer 12 via protective film 13. In other words, electrically conductive layer 14b is a metal layer functioning to remove undesired electrons generated within stimulable phosphor layer 12 from stimulable phosphor layer 12 by exciting the phosphor with X-ray energy or such. Since electrically conductive layer 14b is specifically provided on protective film 13, undesired electrons of stimulable phosphor layer 12 can be easily and efficiently discharged to external materials of the radiation image conversion panel via the electrically conductive layer to remove the undesired electrons, when electrically conductive layer 14b touches the external materials of radiation image conversion panel 10. Since undesired electrons within stimulable phosphor layer 12 can be removed from stimulable phosphor layer 12 by electrically conductive layer 14b, degradation of the stimulable phosphor in stimulable phosphor layer 12 caused by such electrons can be minimized.

The surface resistance of electrically conductive layers 14a and 14b is preferably not more than $2.0 \times 10^{10}$ Ω and more preferably not more than $1.0 \times 10^{8}$ Ω. In the case of an electrically conductive layer having such a surface resistance, undesired electrons generated within stimulable phosphor layer 12 can easily be discharged to the external materials of the radiation image conversion panel via the electrically conductive layer to remove the undesired electrons efficiently, and degradation of the stimulable phosphor in stimulable phosphor layer 12 can be minimized.

Electrical conductivity can be provided to the surface of stimulable phosphor layer 12 by forming electrically conductive layers 14a and 14b on the surface of stimulable phosphor layer 12 of phosphor sheet 20, or on the surface of the stimulable phosphor layer 12 side of protective film 13 placed on the stimulable phosphor layer 12 side of phosphor sheet 20 in this manner. Since undesired electrons generated within stimulable phosphor layer 12 by X-ray exposure can be removed from stimulable phosphor layer 12 via the electrically conductive layer, degradation of the stimulable phosphor in stimulable phosphor layer 12 can be minimized.

Thus, since degradation of the stimulable phosphor in stimulable phosphor layer 12 is minimized, radiation image conversion panel (stimulable phosphor panel) 10 can be a radiation image conversion panel (stimulable phosphor panel) exhibiting resistance against light. When phosphor sheet 20 (stimulable phosphor layer 12) is covered by protective film 13, stimulable phosphor layer 12 can be protected from scratches and other damage, and at the same time change in quality caused by moisture absorption can also be prevented. It is to be understood that radiation image conversion panel (stimulable phosphor panel) 10 is a radiation image conversion panel (stimulable phosphor panel) exhibiting durability.

A radiation image conversion panel in which an electrically conductive layer is provided both on the stimulable phosphor layer 12 side and on the protective film 13 side was described in the above embodiments, employing FIG. 1, but the present invention is not limited thereto. Since an electrically conductive layer may be provided on at least one of the surfaces on the stimulable phosphor layer side of a phosphor sheet and on the stimulable phosphor layer side of a protective film, both a radiation image conversion panel in which an electrically conductive layer is provided only on the stimulable phosphor layer 12 side of the phosphor sheet, and a radiation image conversion panel in which an electrically conductive layer is provided only on the stimulable phosphor layer 12 side of protective film 13 may be prepared.

It is a matter of course that specific parts of details and so forth are also replaceable appropriately.

EXAMPLE

Next, the present invention will be explained employing the following specific examples, but the present invention is not limited thereto. Herein, though a phosphor layer in which stimulable phosphor particles are dispersed in a binder solution is described, a phosphor layer formed by the vapor deposition method such as an evaporation method or such can also be available, as in the case of the phosphor layer formed via coating.

[Preparation of Radiation Image Conversion Panel]

[Preparation of Stimulable Phosphor]

To synthesize a precursor of europium activated barium fluoroiodide stimulable phosphor (Eu-activated BaFI), a reaction vessel was charged with 2780 ml of $BaI_2$ aqueous solution (3.6 mol/l) and 27 ml of $EuI_3$ aqueous solution (0.15 mol/l). The reaction mother liquor in the reaction vessel was maintained at a temperature of 83° C. while stirring, and thereto was added 322 ml of an aqueous solution of ammonium fluoride (8 mol/l) by using a roller pump in order to form precipitates. Thereafter, the reaction mixture was further maintained at that temperature for 2 hours while stirring to allow the precipitates to ripen. These precipitates were then filtered, washed with methanol and dried in vacuo to obtain crystals of a phosphor precursor of europium activated barium fluoroiodide. To prevent deformation of phosphor particles due to sintering during calcination and the change of particle size distribution due to fusing of particles, ultrafine-grained alumina was added thereto in an amount of 0.2% by weight, with sufficient stirring to cause the alumina to adhere uniformly to the surface of the crystals. The crystals were charged into a silica boat and calcined at 850° C. for 2 hours in a hydrogen gas atmosphere, using a tube furnace to obtain europium activated barium fluoroiodide phosphor particles.

Next, after the above europium activated barium fluoroiodide phosphor particles of 100 g was immersed in an ethanol dispersion solution to which 1.0 g of silica particles at an average particle size of 12 nm (produced by Nihon Aerosil Co., Ltd.) and 5.0 g of a silane coupling agent (γ-mercaptopropyl trimethoxysilane) were added, and a slurry was made, a drying process was conducted at 80° C. for 3 hours via filtration and mortar pulverization. Thereafter, the stimulable phosphor particles were subjected to classification to obtain an average particle size of 7 µm.

[Preparation of Stimulable Phosphor Layer Coating Solution]

An amount of 100 g of the above stimulable phosphor and a polyester resin of 16.7 g (VYLON 63SS, produced by Toyobo Co., Ltd.) as a binder were added to an admixture solvent of methylethylketone-toluene (1:1) to be dispersed by a propeller mixer, whereby a coating solution at a viscosity of 25–30 Pa·s was prepared. In addition, the resin and the solvent were left for a day before use in the form of their having been mixed with molecular sieve 4A, after they were dehydrated in advance to use.

[Formation of Stimulable Phosphor Layer, Phosphor Sheet, and Radiation Image Conversion Panel]

After each of the above coating solutions was applied on support 11 made of a 188 µm polyethylene terephthalate film for a total of 230 µm as a coated thickness, stimulable phosphor 12 was formed via drying at 100° C. for 15 minutes to prepare phosphor sheet 20. Thereafter, an Au evaporated layer as electrically conductive layer 14a was provided on the surface of stimulable phosphor layer 12 of phosphor sheet 20 by an evaporator. The above phosphor sheet 20 was covered by protective film 13 to prepare radiation image conversion panel 10. In addition, provided are radiation image conversion panels in which an Au evaporated layer as electrically conductive layer 14b is provided or is not provided on the surface of the stimulable phosphor layer 12 side of protective film 13 placed on the stimulable phosphor layer 12 side of phosphor sheet 20 by the evaporator, to prepare 6 kinds of radiation image conversion panels 10, as shown below.

Incidentally, the surface resistance of each of electrically conductive layers 14a and 14b was measured in accordance with JIS C 2151.

Example 1

An Au evaporated layer at a surface resistance of $2.0 \times 10^{10}$ Ω was provided on the surface of stimulable phosphor 12. However, an Au evaporated layer was not provided on protective film 13, and the surface resistance of protective film 13 was $2.0 \times 10^{13}$ Ω. The evaluation result of degradation of luminance being the quality of radiation image conversion panel 10 is shown in Table 1.

Example 2

An Au evaporated layer at a surface resistance of $1.0 \times 10^{8}$ Ω was provided on the surface of stimulable phosphor 12. However, an Au evaporated layer was not provided on protective film 13, and the surface resistance of protective film 13 was $2.0 \times 10^{13}$ Ω. The evaluation result of degradation of luminance being the quality of radiation image conversion panel 10, is shown in Table 1.

Example 3

An Au evaporated layer having a surface resistance of $1.0 \times 10^{8}$ Ω was provided on the surface of stimulable phosphor 12. Herein, an Au evaporated layer having a surface resistance of $1.5 \times 10^{10}$ Ω was provided on protective film 13. The evaluation result of degradation of luminance being the quality of radiation image conversion panel 10, is shown in Table 1.

Example 4

An Au evaporated layer having a surface resistance of $1.0 \times 10^{8}$ Ω was provided on the surface of stimulable phosphor 12, while an Au evaporated layer having a surface resistance of $1.0 \times 10^{8}$ Ω was provided on protective film 13. The evaluation result of degradation of luminance being the quality of radiation image conversion panel 10 is shown in Table 1.

Example 5

An Au evaporated layer was not provided on the surface of stimulable phosphor 12, and a surface resistance of stimulable phosphor 12 was $1.0 \times 10^{13}$ Ω. Herein, an Au evaporated layer having a surface resistance of $1.0 \times 10^{8}$ Ω was provided on protective film 13. The evaluation result of degradation of luminance being the quality of radiation image conversion panel 10 is shown in Table 1.

Comparative Example 1

No Au evaporated layer was provided on the surface of stimulable phosphor 12, and the surface resistance of stimulable phosphor 12 was $1.3 \times 10^{13}$ Ω, while nor was an Au evaporated layer provided on protective film 13, and a surface resistance of protective film 13 was $2.0 \times 10^{13}$ Ω. The evaluation result of degradation of luminance being the quality of radiation image conversion panel 10 is shown in Table 1.

Comparative Example 2

An Au evaporated layer having a surface resistance of $2.0 \times 10^{11}$ Ω was provided on the surface of stimulable phosphor 12, while no Au evaporated layer was provided on protective film 13, and the surface resistance of protective film 13 was $2.0 \times 10^{13}$ Ω. The evaluation result of degradation of luminance being the quality of radiation image conversion panel 10 is shown in Table 1.

[Evaluation of Degradation of Luminance in Radiation Image Conversion Panel]

Degradation of luminance was measured to be evaluated as shown below.

(X-Ray Damage)

Luminance was measured employing a Regius 170, manufactured by Konica Minolta. After the radiation image conversion panels were each exposed to 200 mR X-rays at a bulb voltage of 8.0 kVp, a signal value of the stimulated luminescence which was read out in a Regius 170 accuracy mode was defined as luminance, whereby evaluation was conducted by calculating the ratio of luminance degradation of a radiation image conversion panel with a compulsory degradation-treated sample, based on a radiation image conversion panel with a reference sample. After the radiation image conversion panel with the compulsory degradation-treated sample was exposed to 200 mR X-rays at a bulb voltage of 80 kVp, and the signals were erased 500 times by Regius 170, luminance of the compulsory degradation-treated sample was acquired. A ratio of luminance degradation, based on initial luminance, was calculated and rated as shown below.

5: Luminance degradation ratio less than 2%
4: Luminance degradation ratio not less than 2% but less than 5%
3: Luminance degradation ratio not less than 5% but less than 10%
2: Luminance degradation ratio less than not less than 10% but less than 15%
1: Luminance degradation ratio not less than 15%

Based on this 5-grade criteria rating, a grade 3 or higher was designated as being commercially viable.

The obtained results will be shown in following Table 1.

phosphor sheet 20, or on the surface of the stimulable phosphor layer 12 side of protective film 13 placed on the stimulable phosphor layer 12 side of phosphor sheet 20 in this manner. Since undesired electrons generated within stimulable phosphor layer 12 by repetitive X-ray exposure can be removed from stimulable phosphor layer 12 via the electrically conductive layer, degradation of the stimulable phosphor in stimulable phosphor layer 12 can be minimized. Thus, since degradation of the stimulable phosphor in the stimulable phosphor layer can be minimized, a radiation image conversion panel exhibiting X-ray resistance, or such can be manufactured. It is to be understood that radiation image conversion panel 10 of the present invention is a radiation image conversion panel in which luminance degradation caused by X-ray damage is lowered.

[Effect of the Invention]

According to the radiation image conversion panel of the invention described in Structure 1, electrical conductivity is provided to a stimulable phosphor layer surface by forming an electrically conductive layer on the stimulable phosphor layer surface. Similarly, electrical conductivity is also added to the stimulable phosphor layer surface by forming the electrically conductive layer on the surface of the stimulable phosphor layer side of the protective film covering the phosphor sheet, and by having the electrically conductive layer which touches the stimulable phosphor layer. Thus, undesired electrons generated within the stimulable phosphor layer can be easily discharged from the stimulable phosphor layer by providing electrical conductivity to the stimulable phosphor layer. Undesired electrons, generated within the stimulable phosphor layer by exciting the phosphor with the X-ray energy or such, can be efficiently removed from the stimulable phosphor layer by the electri-

TABLE 1

| | Au evaporated layer on the stimulable phosphor surface | Surface resistance ($\Omega$) | Au evaporated layer on the protective film surface | Surface resistance ($\Omega$) | Degradation of luminance |
|---|---|---|---|---|---|
| Comparative example 1 | Not Formed | $1.3 \times 10^{13}$ | Not Formed | $2.0 \times 10^{13}$ | 1 |
| Comparative example 2 | Formed | $2.0 \times 10^{11}$ | Not Formed | $2.0 \times 10^{13}$ | 2 |
| Example 1 | Formed | $2.0 \times 10^{10}$ | Not Formed | $2.0 \times 10^{13}$ | 3 |
| Example 2 | Formed | $1.0 \times 10^{8}$ | Not Formed | $2.0 \times 10^{13}$ | 4 |
| Example 3 | Formed | $1.0 \times 10^{8}$ | Formed | $1.5 \times 10^{10}$ | 4 |
| Example 4 | Formed | $1.0 \times 10^{8}$ | Formed | $1.0 \times 10^{8}$ | 5 |
| Example 5 | Not Formed | $1.0 \times 10^{13}$ | Formed | $1.0 \times 10^{8}$ | 3 |

If an Au evaporated layer as a metal layer functioning to remove undesired electrons generated within stimulable phosphor layer 12 from stimulable phosphor layer 12 is prepared, and its surface resistance is not more than $2.0 \times 10^{10}$ $\Omega$, it is to be understood that radiation image conversion panel 10 with less luminance degradation can be manufactured. If the surface resistance of the Au evaporated layer is not more than $1.0 \times 10^{8}$ $\Omega$, radiation image conversion panel 10 exhibiting still lower luminance degradation can be obtained. Specifically, radiation image conversion panel 10 having further lowered luminance degradation can be obtained by preparing Au evaporated layers for both stimulable phosphor layer 12 and protective film 13.

Electrical conductivity can be provided to the surface of stimulable phosphor layer 12 by forming electrically conductive layers 14a and 14b such as an Au evaporated layer or so forth on the surface of stimulable phosphor layer 12 of cally conductive layer. Since undesired electrons within the stimulable phosphor layer can be efficiently removed from the stimulable phosphor layer by the electrically conductive layer, degradation of the stimulable phosphor in the stimulable phosphor layer caused by such electrons can be minimized. When an electrically conductive layer is provided on at least one of surfaces on the stimulable phosphor layer side and on the stimulable phosphor layer side of the protective film covering the phosphor sheet in this manner, degradation of the stimulable phosphor caused by electrons generated via exposure to light irradiation can be minimized, whereby a radiation image conversion panel exhibiting X-ray resistance or such can be obtained.

According to Structure 5, similarly to what is described in Structures 1, undesired electrons generated within the stimulable phosphor layer can be easily discharged to the exterior of the radiation image conversion panel via the electrically conductive layer to efficiently remove the undesired electrons. Thus, degradation of the stimulable phosphor in the stimulable phosphor layer can be minimized, whereby a radiation image conversion panel exhibiting X-ray resistance or such can be obtained.

According to Structure 6, similarly to what is described in Structure 1 or 5, the stimulable phosphor is a rare earth activated alkaline earth metal fluorohalide stimulable phosphor represented by General Formula (I). Since a rare-earth activated alkaline earth metal fluorohalide stimulable phosphor exhibits high radiation (X-ray) absorption, a high-sensitivity stimulable phosphor layer can be formed to manufacture a radiation image conversion panel capable of recording and photographing further improved images.

According to Structure 7, similarly to what is described in any one of Structures 1–6, since the stimulable phosphor is a stimulable phosphor possessing BaFI as the principal substance, a high-sensitivity stimulable phosphor layer can be formed to manufacture a radiation image conversion panel capable of recording and photographing further improved images.

What is claimed is:

1. A radiation image conversion panel comprising a phosphor sheet having a support and provided thereon, a stimulable phosphor layer, and a protective film covering the phosphor sheet,
wherein an electrically conductive evaporated metal layer having a surface resistance of not more than $1.0 \times 10^8$ Ω is provided on either the phosphor sheet or the protective film, and is brought into contact with a surface of the phosphor sheet on a stimulable phosphor layer side.

2. The radiation image conversion panel of claim 1, wherein the electrically conductive evaporated metal layer is provided on the phosphor sheet, and is brought into contact with the surface of the phosphor sheet on the stimulable phosphor layer side.

3. The radiation image conversion panel of claim 1, wherein the electrically conductive evaporated metal layer is provided on the protective film, and is brought into contact with the surface of the phosphor sheet on the stimulable phosphor layer side.

4. The radiation image conversion panel of claim 1, wherein the electrically conductive evaporated metal layers are provided on both the phosphor sheet and the protective film, and are brought into contact with the surface of the phosphor sheet on the stimulable phosphor layer side and a surface of the electrically conductive layer provided on the stimulable phosphor layer.

5. The radiation image conversion panel of claim 1, wherein the stimulable phosphor is a rare earth activated alkaline earth metal fluoride stimulable phosphor represented by following Formula (I):

General Formula;

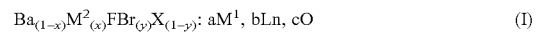

$$Ba_{(1-x)}M^2{}_{(x)}FBr_{(y)}X_{(1-y)}: aM^1, bLn, cO \qquad (I)$$

where $M^2$ is at least an alkaline earth metal atom selected from the group consisting of Mg, Ca, Sr and Cd; X is at least a halogne atom selected from the group consisting of Li, Na, K, Rb and Cs; Ln is at least a rare earth atom selected from the group consisting of Ce, Pr, Sm, Eu, Gd, Tb, Tm, Dy, Ho, Nd, Er and Yb; and x, y, a, b and c are values satisfying the following conditions: $0 \leq x \leq 0.3$, $0 \leq y \leq 0.3$, $0 \leq a \leq 0.05$, $0 \leq b \leq 0.2$ and $0 \leq c \leq 0.1$.

6. The radiation image conversion panel of claim 1, wherein the stimulable phosphor is a stimulable phosphor comprising BaFI as a principal substance.

* * * * *